4 Sheets--Sheet 3.
E. H. CLINTON.
Harvesters.
No. 145,050.  Patented Dec. 2, 1873.
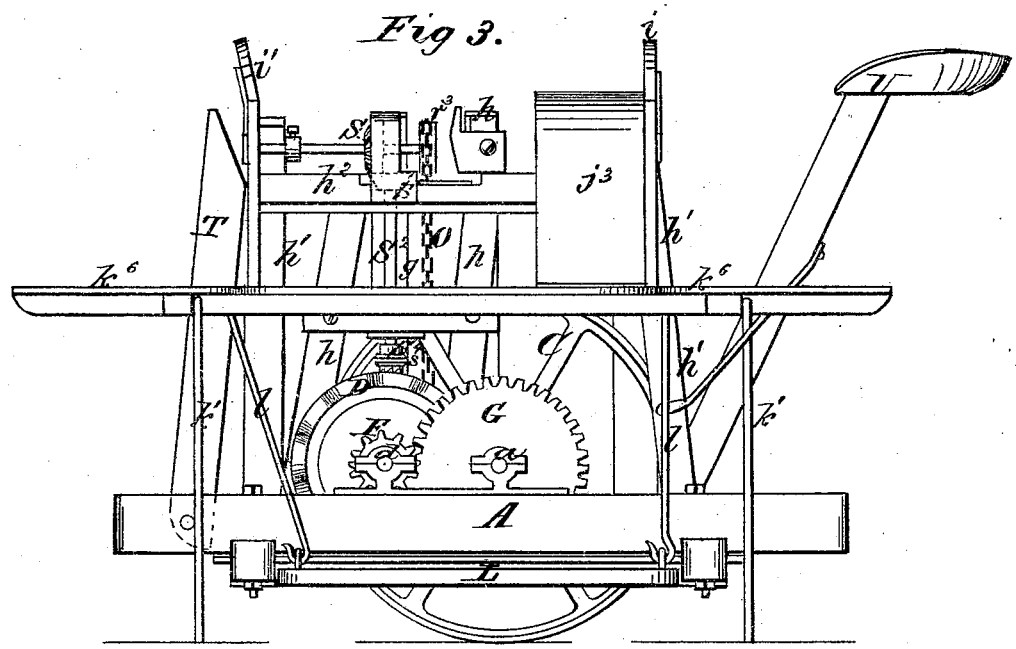
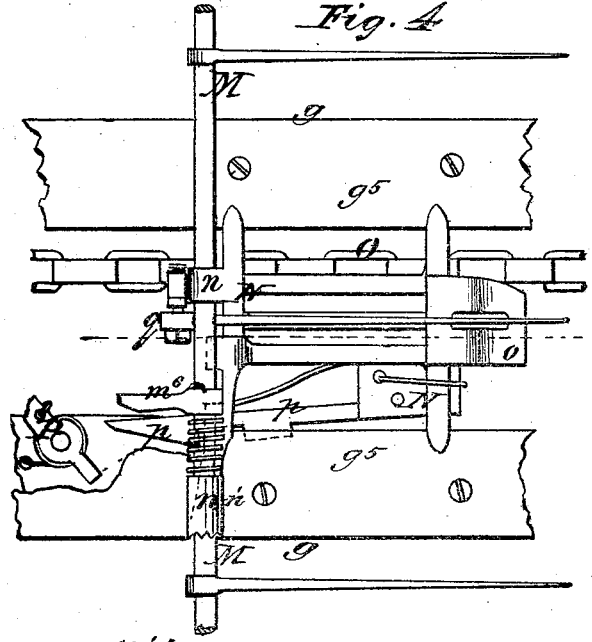
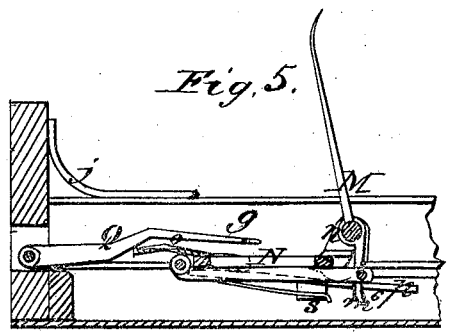
Inventor.
Edward H. Clinton
by
Mason Fenwick Lawrence
Witnesses.
James Martin Jr
G. N. Campbell

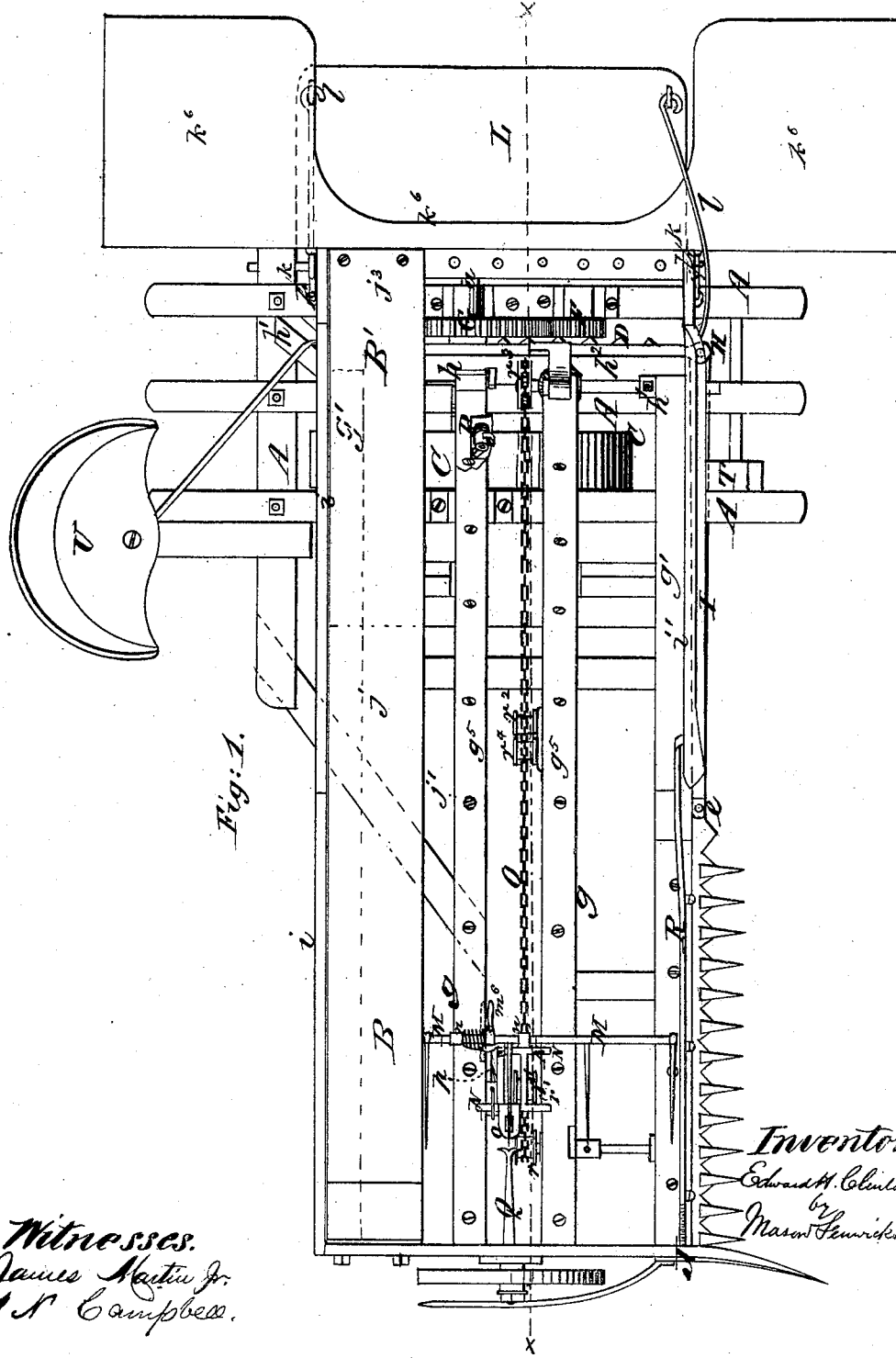

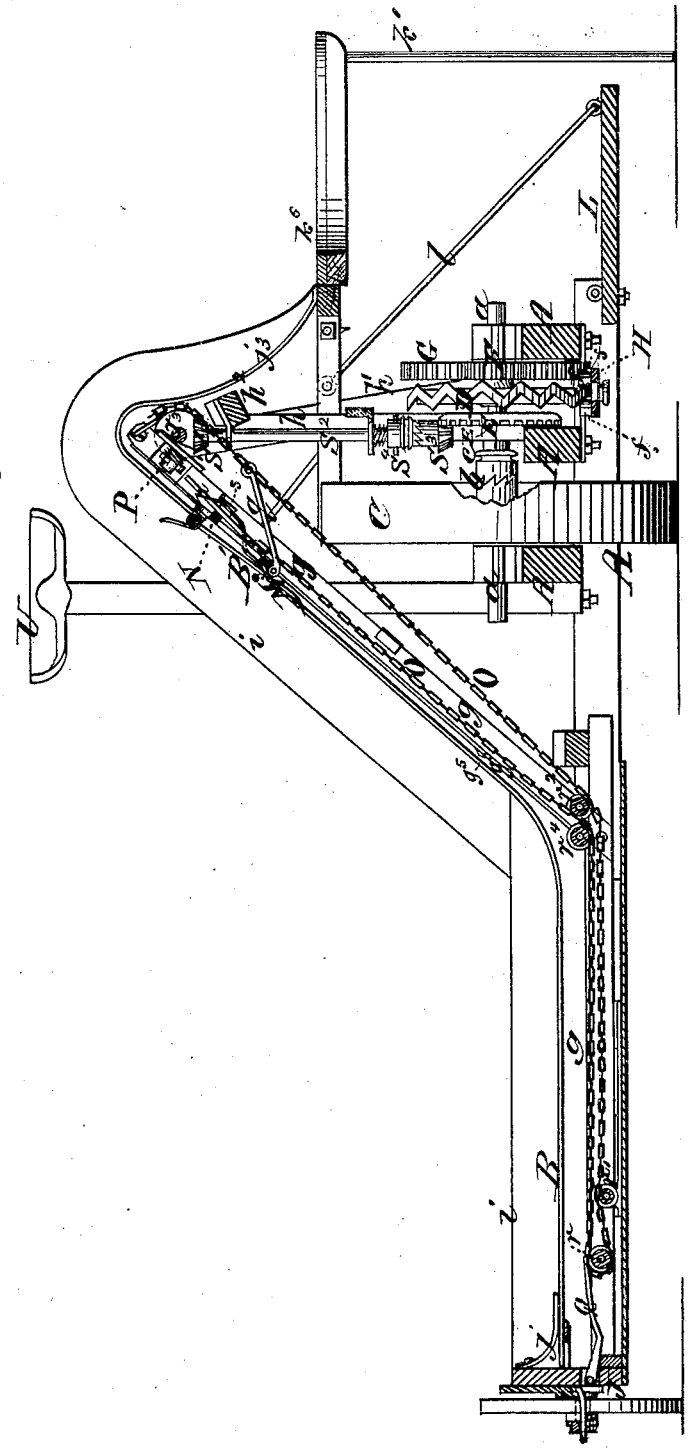

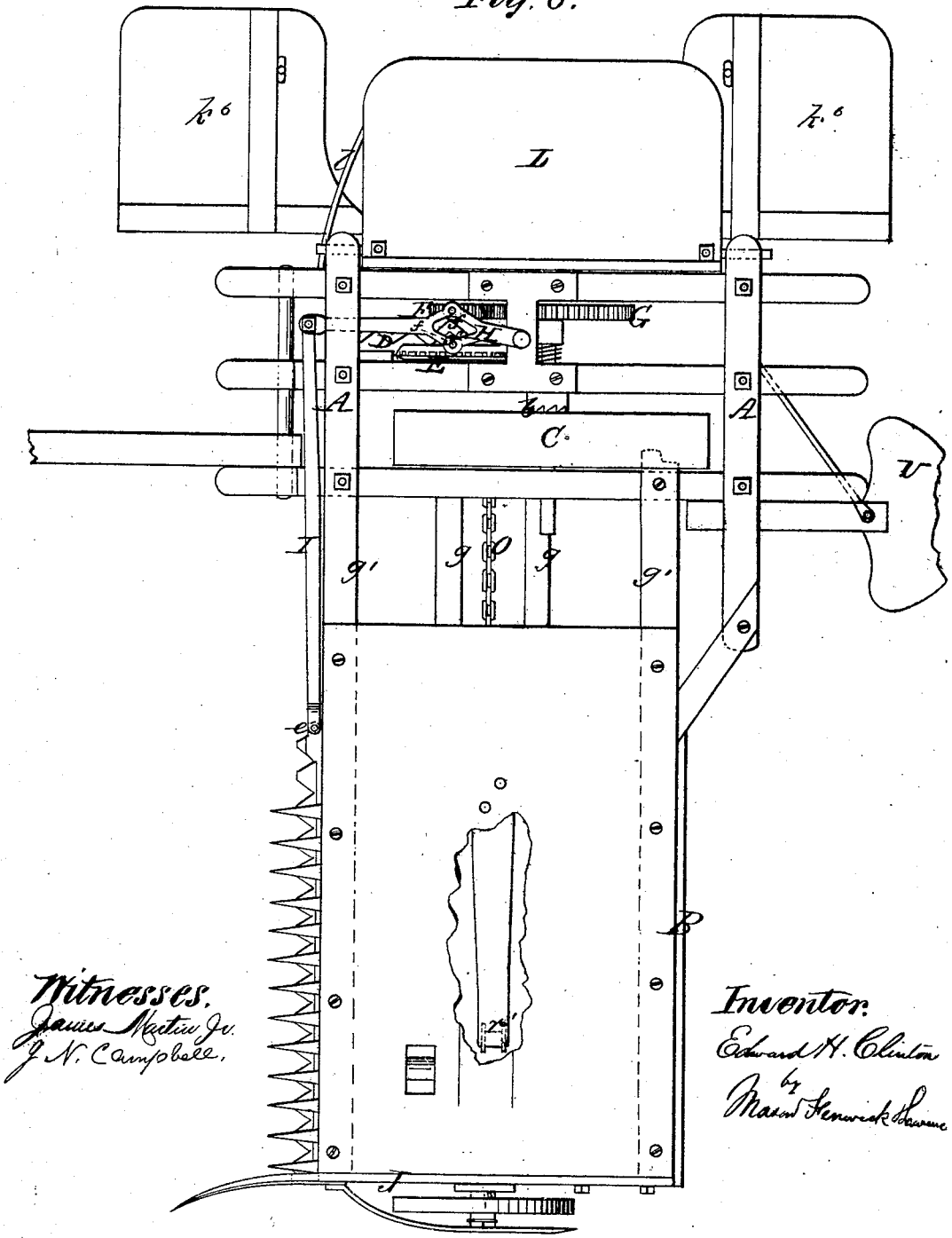

UNITED STATES PATENT OFFICE.

EDWARD H. CLINTON, OF IOWA CITY, IOWA.

IMPROVEMENT IN HARVESTERS.

Specification forming part of Letters Patent No. 145,050, dated December 2, 1873; application filed October 20, 1873.

*To all whom it may concern:*

Be it known that I, EDWARD H. CLINTON, of Iowa city, county of Johnson and State of Iowa, have invented a new and useful Improvement in Harvesters with rake attached thereto; and I do hereby declare that the following is a full, clear, and exact description thereof, reference being had to the accompanying drawings, making part of this specification, in which—

Figure 1 is a top view of my improved harvester and rake, a portion of the slatted platform and of one of the guide-rails of the rake-head being removed in order to show the rake and its mechanism. Fig. 2 is a vertical longitudinal section of the harvester in the line $xx$ of Fig. 1. Fig. 3 is an end view of the harvester, seen from the outer side of the draft-frame. Fig. 4 is a plan view, on an enlarged scale, of a portion of the rake-guides and rake mechanism as the parts appear after the rake has delivered itself of grain. A portion of one of the guides is broken away to show the trip which releases the rake-head from the catch which holds the teeth in an elevated position. The parts are shown as they would appear on a horizontal plane, instead of on the inclined plane, in order to more distinctly show their shape. Fig. 5 is a longitudinal section, on an enlarged scale, of a portion of the harvester and rake mechanism as the rake appears after it has had its teeth elevated and its head locked for raking, and has passed forward a short distance. Fig. 6 is a bottom view of the harvester.

The nature of my invention consists, first, in the combination of a spur and bevel wheel on the shaft which carries the device which reciprocates the sickle, and geared with the driving-wheel shaft, with a bevel-wheel, vertical shaft, a clutch, two other bevel-wheels, a sprocket-pulley, and an endless chain, which carries a grain-elevating rake, in the manner hereinafter described. Second, it consists in a vibrating reciprocating rake mechanism, which combines an endless chain arranged on, around, and between pulleys, and forming an angle in passing from the horizontal portion of the grain-platform to the inclined elevating portion thereof; a vibrating reciprocating toothed rake; a rake-tooth-elevating lever; a cam for operating said lever; a catch and latch for locking the rake in an elevated position; a connecting-arm attached to the chain; and traveling at one of its ends around the pulleys, for carrying the rake back and forth on the same side of its guides; and a trip for unlatching the rake and allowing its head and teeth to pass under the slatted platform in making a return movement, as will be hereinafter described. Third, it consists in the construction and operation of other details of the rake mechanism, as will be hereinafter explained. Fourth, it consists in the combination of the vibrating reciprocating rake, endless chain, and connecting-arm for carrying the rake, a grain platform, which is horizontal from the outer divider to the heel of the cutting apparatus, and from there inclined and extended up over the draft-frame, and terminated in a curved gavel-receiver, all as will be hereinafter described.

To enable others skilled in the art to make and use my invention, I will proceed to describe the same with reference to the drawings.

A represents the draft-frame, and B B' the grain-platform, of the harvester. C is the traction-wheel fitted loosely upon an axle, $a$, and formed with a clutching-hub, $b$, with which a sliding spring-clutch, $c$, of the axle connects when it is desired to have the axle revolve with the wheel C. The clutch is to be operated by a lever extended up to the driver's seat. D is a serpentine cam-wheel fastened tight on a shaft, $d$, located forward of the traction-wheel shaft. On one side of this cam-wheel there is a bevel-pinion wheel, E, and on the opposite side a spur-pinion wheel, F; both of these wheels are fast, with the cam on the shaft $d$. The spur-wheel F gears with a large spur-wheel, G, which is fast on the axle of the traction-wheel. H is a vibrating lever pivoted in rear of the shaft $d$ to a cross-plate under the bottom of the draft-frame. This lever is widened out about midway of its length, so as to form two lateral offsets, the metal of the lever between the offsets being cut out in order to lighten the weight of the lever. On each of these offsets a vertical cylindric tooth or friction-roller shaped projection, $f$, is set, one projection or tooth being in contact with one of the cam-faces of the wheel D, and the other in contact with the other cam-face of said wheel. The lever H extends slightly beyond the forward sill of the grain-platform frame, and is connected by a pivot with a transverse connecting-rod, I, which runs along in front of said sill to the heel of the sickle, and is connected at that point to the sickle by a vertical pivot, $e$. This construction and arrangement insures a reciprocation of the sickle without the use of a revolving crank, the cam-faces of the wheel D causing the projections $f\ f$ to move to the right and left as the wheel revolves, and by this means the forward end of the lever is vibrated in a horizontal plane, and with it and the connecting-rod the sickle is moved back and forth between the guard-fingers. To construct the grain-platform in the manner represented, I extend the front and rear bottom beams of the draft-frame to the grain-divider J, and to the under side of these beams a sheet-iron or other close bottom is attached, and between these beams two narrower timbers, $g\ g$, are arranged. These intermediate timbers extend on a horizontal line near to the inner side of the draft-frame, and from that point they are extended on an incline plane up over the draft-frame, and rest upon one of the vertical studs $h$ and the cross-tie of the studs. Two other inclined timbers, $g^1\ g^1$, are extended up in the same manner from the top of the front and rear beams of the draft-frame, and are supported by nearly upright studs $h^1\ h^1$ of the draft-frame. The studs are tied together by a beam, $h^2$, at top, as shown. On the top of the intermediate timbers $g\ g$ plates $g^5$ are applied, so as to extend over the inner edges of the timbers and form guiding-flanges for holding the rake in position and guiding it in its movements. At the back of the horizontal and inclined portions of the grain-platform a guard-board, $i$, for keeping the grain on the platform while being raked off, is constructed, and at the front of the inclined portion of the platform there is a similar guard-board, $i'$. The grain-surface of the platform I construct of narrow slats $j\ j$, set apart to form spaces $j^1\ j^1$, for the rake-teeth to move through, as shown. These slats are curved at the grain end of the platform; also are made to form an angle or curved corner at the terminus of the horizontal part of the platform, then to run upon an inclined plane over the draft-frame, and then to form another angle or curved corner and descend on an incline in a concave form, as seen at $j^3$, and finally attach to the cross or tie timbers of the draft-frame, as shown. The concave $j^3$ serves as a grain-gavel receiver, from which the binders can take the grain and bind it. Just at the terminus of the grain-gavel receiver a board, $k^6$, for two binders, is hung and supported horizontally, by means of hooks $k$ and stay-rods $k'$. The top of table is cut away between its ends to permit the binders to get close to the gavel-receiver; and just below this table a stand-board, L, is attached to the draft-frame by hinges, and supported by rods $l$, as shown. The binders' table can be removed and the stand-board turned up against the machine in passing through narrow places. The rods $k'$ are shown pendent, but they may be connected by their lower ends to the draft-frame. For raking the grain up to the gavel-receiver I employ a toothed rake, M, consisting of a rod with teeth set at right angles to its axis, the ends of the teeth being slightly curved or turned up. This rake is placed upon the guide-plates $g^5$, under the slats $j$, and connected by eye-bearings $n\ n$ to a skeleton-grooved slide, N, which is fitted loosely upon the flanges of the guide-plates, so as not to be capable of separating therefrom. This slide has an inclined or cam-shaped tongue, $o$, extending from its rear end for a purpose presently described. It also has a beveled spring-catch, $p$, applied on one side, just below one of the guide-flanges, $g^5$, of the rake. The rake-head has a beveled spring-latch, $m^6$, arranged upon it, which takes hold of the catch $p$ during a certain stage of the movement of the rake. This slide, with the rake, is connected to an endless chain, O, by means of a connecting-rod, $q$, this rod being pivoted to the rear end of the slide, underneath, and to one edge of the endless chain, as shown. The endless chain passes first around a pulley, $r$, then over a spring-pressure or tension pulley, $r^1$, then under and over a pulley, $r^2$, then around a sprocket-wheel, $r^3$, and then under a pulley, $r^4$, as shown in the drawings. P is a spring-vibrating tripper, for tripping the catch which holds the rake-teeth elevated. The cam-projection $s$ of the catch strikes this tripper as the rake moves back, and the tripper causes the catch to free itself from the latch. The tripper is yielding to the rake in the forward movement thereof, and rigid against it in the back movement. Q is a pivoted gravitating lifter, for elevating the teeth of the rake when the rake returns for a new load of grain. The cam-extension $o$ passes under this lifter as the rake passes back, and causes the lifter to rise and elevate the rake-teeth. The tripper P is arranged under one of the guides $g^5$, near the upper terminus of the inclined portion of the platform, and the lifter Q is arranged upon the outer grain-divider, about in line with the endless chain. R is a rod over the finger-beam, for the purpose of holding up the butts of the grain after it falls upon the platform. The sprocket-pulley $r^3$ is on a shaft which carries a bevel-wheel, S. This bevel-wheel gears with a bevel-wheel, $S^1$, of a vertical shaft, $S^2$. On the shaft $S^2$ is a bevel-wheel, $S^3$, which has a clutching-hub for matching the clutch $S^4$ of said shaft. The clutch $S^4$ of this shaft is to be operated by a lever extending from the driver's seat. The wheel $S^3$ gears with the bevel-wheel E of the serpentine cam. By means of the clutch $S^4$ the rake mechanism can be stopped without interfering with the cutting mechanism, and, by means of the clutch $c$, the whole machine can be stopped. T is a portion of the draft-tongue, and U the driver's seat. The draft-tongue is turned up in the drawings.

The operation is as follows: The machine being drawn forward, and a sufficient quantity of grain cut and deposited upon the horizontal part of the platform, the clutch $S^4$ is adjusted and the rake mechanism put in gear with the power mechanism. This causes the rake to move and carry the cut grain across the horizontal part of the platform, and up the inclined portion of the gavel-receiver and deposit the grain into the receiver. At this point the pivot which connects the chain to the rod $q$ of the rake moves around the axle of the pulley $r^3$ with the chain, and acts with a thrust instead of a pull upon the rake, and in a moment thereafter the cam $s$ of the catch strikes the tripper P, and causes the catch to move aside and free the latch $m^6$ of the rake, when the rake-teeth spring down below the grain surface of the platform; the rake continues to go back, and in this back movement the cam-shaped tongue $o$ passes under the lifter Q, and causes it to rise and throw up the rake-teeth, when the catch again takes hold of the latch, at which moment the pulling action of the rod $q$ again commences, and a new forward movement of the rake goes on, if the grain has been cut fast enough to give it a sufficient load; but if it has not, the clutch is adjusted to throw the rake mechanism out of gear until a load is cut. As fast as the grain is raked up the binders take it from the gavel-receiver and bind it upon the table, and deposit it bound upon the ground.

What I claim as my invention, and desire to secure by Letters Patent, is—

1. The pinion-wheel F and bevel-wheel E on the shaft which carries the device which reciprocates the sickle, and are geared with the traction-wheel shaft, in combination with the bevel-wheel $S^3$, vertical shaft $S^2$, clutch $S^4$, bevel-wheels S $S^1$, sprocket-pulley $r^3$, and endless chain O, which carries the grain-elevating rake, substantially as and for the purpose described.

2. The vibrating reciprocating toothed rake M, endless chain O, horizontal and inclined grain-platform B B, pivoted lifting-lever Q, cam $o$, catch $p$, spring-trip P, constructed, arranged, combined, and operating substantially in the manner herein described and shown.

3. The cam-extension $o$ of the rake, slide N, and pivoted lifting-lever Q, combined, for the purpose described.

4. The spring-trip P, in combination with the cam $s$ of the spring-catch $p$, arranged and operating as described.

EDWARD H. CLINTON.

Witnesses:
LOUIS H. JACKSON,
H. W. FYFFE.